United States Patent [19]

Schmidt

[11] 4,245,669

[45] Jan. 20, 1981

[54] SELF-ACTUATED FLOW REGULATOR SYSTEM

[76] Inventor: Alfred C. Schmidt, P.O. Box 111, San Carlos, Calif. 94070

[21] Appl. No.: 934,464

[22] Filed: Aug. 17, 1978

Related U.S. Application Data

[62] Division of Ser. No. 769,016, Feb. 16, 1977, Pat. No. 4,134,572.

[51] Int. Cl.³ .............................................. G05D 7/01
[52] U.S. Cl. .................................. 137/550; 55/210; 55/417; 137/501; 137/505.46
[58] Field of Search .......... 137/501, 502, 503, 505.46, 137/DIG. 8, 544, 545, 549, 550; 55/210, 385 R, 417

[56] References Cited

U.S. PATENT DOCUMENTS

| 2,776,056 | 1/1957 | Douglas | 137/544 X |
|---|---|---|---|
| 2,819,774 | 1/1958 | Schmidt | 55/210 |
| 2,880,753 | 4/1959 | Wilkins | 137/549 |
| 3,028,876 | 4/1962 | Gratzmuller | 137/545 X |
| 3,501,899 | 3/1970 | Allen | 55/417 |
| 3,599,658 | 8/1971 | Kruzan | 137/505.46 X |

*Primary Examiner*—Robert G. Nilson
*Attorney, Agent, or Firm*—Julian Caplan

[57] ABSTRACT

An improved self-actuated constant flow rate regulator system is described which can keep the rate of flow of fluid through a filter or other variable load constant within close limits. One application for this invention is for sampling the air for toxic dusts in factories where it is desirable to draw air through a collecting filter at a preset rate regardless of the amount of deposit on the filter and where a number of such filters may be connected to a central vacuum pump. The system comprises a differential pressure regulator and an adjustable metering orifice working in conjunction with each other. The regulator senses the pressure drop across the orifice and governs the flow rate accordingly. Details of the regulator valve and of the metering orifice are set forth which contribute to improved operating performance and manufacturing efficiency.

24 Claims, 5 Drawing Figures

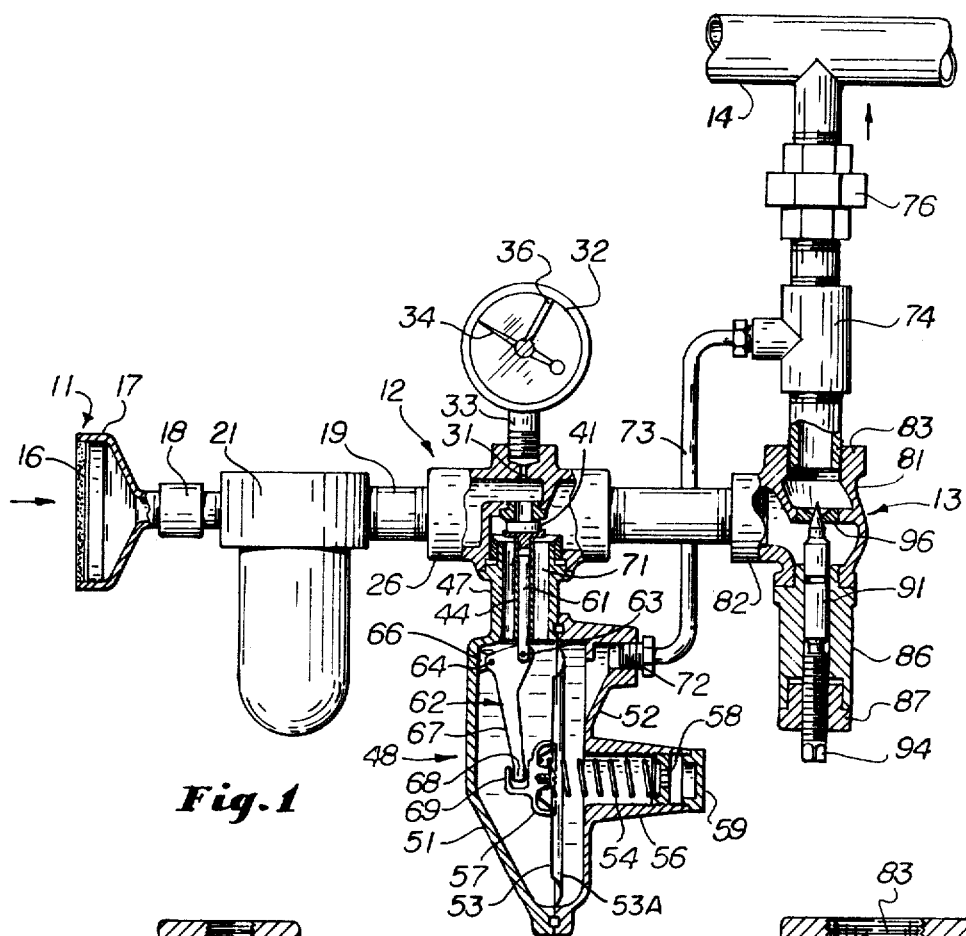
Fig. 1
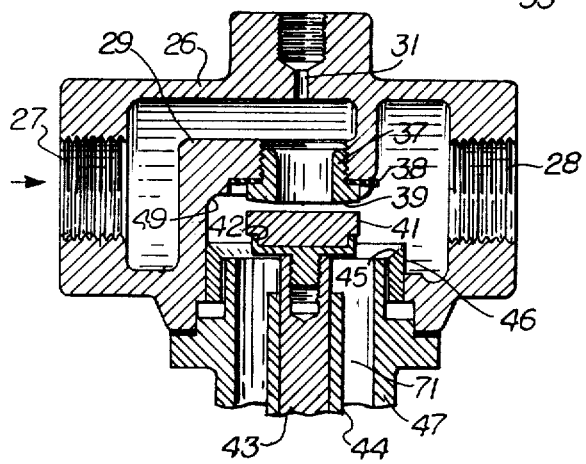
Fig. 2
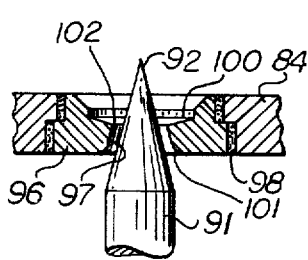
Fig. 4
Fig. 3

SELF-ACTUATED FLOW REGULATOR SYSTEM

This application is a division of my co-pending Application Ser. No. 769,016, filed Feb. 16, 1977, now U.S. Pat. No. 4,134,572.

This invention relates to a new and improved self-actuated constant flow rate regulator system.

More particularly, the present invention is employed with a central pumping system creating a vacuum used at a plurality of stations; and each station has an independent, high performance, automatic constant flow rate regulator system which provides for constant flow of air or other gas through a filter so as to monitor the air or gas, particularly at a location where workmen may be exposed to toxic dusts.

Among the advantages of a central vacuum source for a plurality of stations are the fact that one heavy duty pump takes the place of a number of smaller pumps, thereby reducing maintenance problems and costs and also making it possible to provide a standby pump at a central source. Pump noise and pump exhaust at the sampling stations is thus reduced or eliminated. There is no need to make sure that a number of independent air samplers are running. In addition, the initial cost, including piping, is less than the cost of an equal number of independent units.

Other advantages reside in the system installed at each sampling station. A central pumping system maintains a constant vacuum in the piping network so that the individual stations can be adjusted or shut off without affecting the others. The flow regulator at each station is easily calibrated and maintains constant flow through the filter despite the fact that the filter load may vary from zero to as much as 90% of the system vacuum. Automatic flow control permits sampling with small, high efficiency filters, because the resistance of the filter is compensated for by the invention. Using the same filters for long periods of time without attention also is possible, and the filters may be installed on the ends of extension hoses where mobility is required. With the small filters which may be used in multiple sampling stations, the sample obtained from the filter for monitoring is convenient.

Specifically, the system is quiet, easy to use, produces accurate results, saves initial operating costs and analytical costs.

A particular feature and advantage of the invention resides in the details of the flow regulator. As the filter becomes plugged, the differential regulator senses a change in pressure drop across a metering orifice and automatically opens to keep the flow constant. The flow rate is set by connecting a calibrated flow meter to the inlet coupling in place of the filter holder and adjusting the effective size of the metering orifice to accomplish the desired flow rate.

Further, a control limit (where the regulator ceases to be effective) is determined by connecting a load simulator valve between the calibrating flow meter and the inlet coupling enclosing it to simulate filter loading. A vacuum gauge in the system is provided with a marker which is adjusted to indicate on the vacuum gauge the control limit. Other features are included to achieve more consistent and accurate flow control, and to make more effective use of the available pressure or vacuum.

The regulator valve body is so constructed as to direct the flow coming through the valve seat toward the higher pressure side of the diaphragm of the pressure regulator, creating an impact pressure. This impact pressure is greatest when the valve disc is nearly closed and the velocity is highest and diminishes as the valve disc opens to compensate for increased filter loads. The resulting decrease in impact pressure creates a boost effect which partly compensates for the reduced force of the regulator spring as the valve disc opens and thus helps to keep the differential pressure maintained by the regulator constant and hence maintains constant flow through the filter.

The regulator valve has a specially constructed interior configuration, seat ring, valve disc, flow control plate and body liner which produces the aforementioned boost effect. All of these elements which are in contact with the high velocity flow have sharp outer corners, where the flow of fluid detaches from them, to prevent inconsistent flow patterns from developing. In addition, the regulator valve has a small included angle between the disc and the surface of the seat ring to prevent boundary layer separation ("stall") and inconsistent flow patterns which occur when larger angles are employed.

Further features of the invention reside in the adjustable metering orifice which creates a pressure drop between the regulator and the source of vacuum. The metering orifice has a valve spindle which must be concentric with the valve orifice and maintain concentricity as it moves in and out. Accordingly, the present invention provides a special guide bore in the bonnet of the valve to hold the spindle in alignment. The thread of the bonnet is used only for axial positioning. An orifice bushing which mates with the tip of the valve spindle is installed on a "floating principle", namely, the tip of the spindle is inserted in the orifice bushing and maintained in such position until an epoxy or other adhesive has fixed the orifice bushing in place. Similarly, a thread bushing is "floated" into position in the bonnet of the valve and held with epoxy or other adhesive after the assembly is in place. Thereby alignment is accurately provided.

The floating of the orifice bushing into place permits the orifice to be located exactly on the center line of the spindle. It also permits the orifice to be machined separately from the body of the metering valve and to be made of a different material than the body if desired.

Another feature of the adjustable metering orifice is the fact that the orifice is conical and has the same angle as the tip of the spindle. This prevents boundary layer separation ("stall") and inconsistent flow patterns which occur when a conical tip is used in a cylindrical bore. Further, by reason of having the same angle as the spindle, the orifice is not damaged when the spindle is closed tightly. Also, by reason of having a sharp outlet corner on this orifice, inconsistent patterns are kept from developing in the discharge flow.

The differential pressure regulator herein described is only one type of regulator construction which will meet the essential requirements of this invention. Other regulator constructions, which are well known in the regulator art, may similarly be modified according to the same general principles to achieve the high level of performance that is desired for accurate flow control purposes, and efficient use of the available pressure or vacuum. These principles consist of (a) using small included angles in expanding flow passages to prevent boundary layer separation (stall) and inconsistent flow patterns from occurring; (b) employing sharp corners on flow detachment surfaces to prevent inconsistent flow patterns from developing; (c) using the high velocity stream from the regulator valve seat to exert an impact pressure on the higher pressure side of the diaphragm, and thereby help compensate for the decreasing force of the regulator spring as the valve seat opens under constant flow conditions; and (d) providing a gauge with a limit marker to show the user whether the load is within the range where the regulator can keep the flow constant.

Other objects of the present invention will become apparent upon reading the following specification and referring to the accompanying drawings in which similar characters of reference represent corresponding parts in each of the several views.

In the drawings:

FIG. 1 is an elevational view of the system partly broken away in section to reveal internal construction.

FIG. 2 is an enlarged sectional view of the valve portion of the differential pressure regulator.

FIG. 3 is an enlarged sectional view of the metering orifice, shown with the spindle closed.

FIG. 4 is a further enlarged sectional view of a portion of the structure of FIG. 3 with the spindle partially open.

Figure 5:
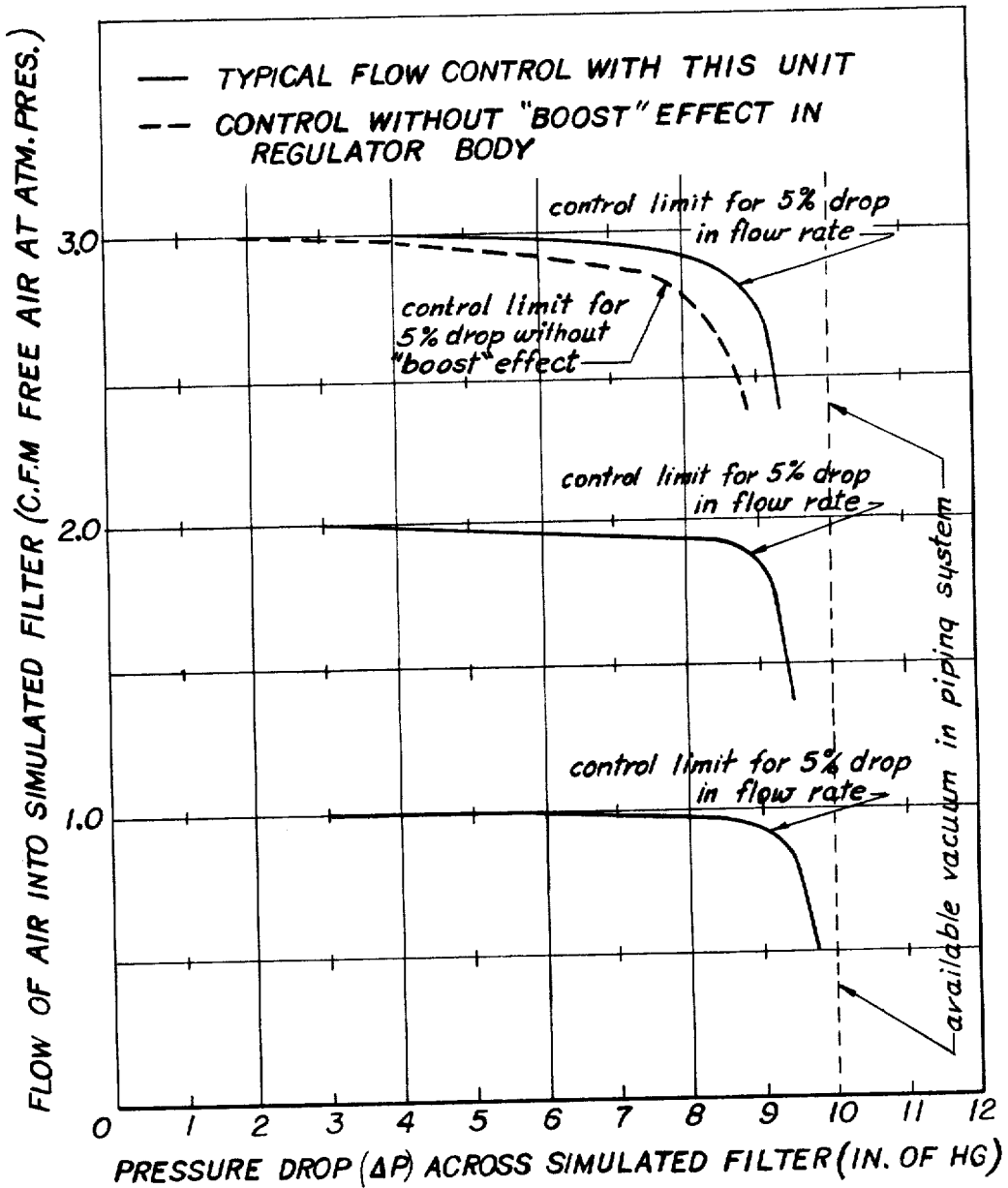
FIG. 5 is a graph showing performance curves for the air sampling flow regulator in accordance with the present invention.

Directing attention to FIG. 1, the system has as its most important elements a filter 11 connected to one side of a differential pressure regulator 12. On the opposite side of the regulator 12 is an adjustable metering orifice 13, and beyond the orifice 13 is a source of vacuum 14 here shown as a pipe connected to a relatively remote vacuum pump which has means for keeping the vacuum in the piping constant. The regulator 12 senses the differential in pressure between the side of its valve closest to the metering orifice 13 and the source of vacuum 14. The regulator 12 opens and closes so as to maintain a constant flow of air or other fluid through the filter 11 regardless of the clogging of the filter as the load on the filter increases.

The filter 11 has filter media 16 in a filter holder 17. The filter media 16 may be removed from time to time for analysis of the deposit which collects on the filter, all as well understood in the air sampling art. Holder 17 is connected to the piping system 19 by a quick-connective coupling 18. This enables the holder 17 to be changed from time to time and also is of assistance in calibration as hereinafter appears. A protective filter and trap 21 is preferably installed between the coupling 18 and the regulator 12.

DIFFERENTIAL PRESSURE REGULATOR

Regulator 12 has a valve body 26 having inlet 27 and outlet 28 which are connected into the piping system 19. A valve seat partition 29 is interposed between inlet 27 and outlet 28. On the inlet side of partition 29 is an opening 31 in the body 26 which communicates with a vacuum gauge 32 having a stem 33. Gauge 32 has a pointer 34 which indicates the vacuum on the opening side of the regulator. During calibration, a control limit marker 36 is manually positioned to indicate the control limits of the system relative to the position of pointer 34.

A valve seat ring 37 is threaded into an opening in the partition 29. Between a shoulder on the ring 37 and the partition 29 is an enlarged flow control plate 38 which is a thin piece having a sharp corner of approximately 90°. As best shown in FIG. 2, the surface 39 of the ring 37 remote from the partition 29 is formed with a convex conical bevel of about 5° ending in a sharp corner of approximately 90°.

Cooperating with the surface 39 is a valve disc 41 which is flat with a sharp corner of approximately 90° and seats against the surface 39 in the closed position of the valve. Disc 41 is secured in a disc holder 42 threaded into the end of the valve stem 43. Surrounding stem 43 is a sleeve 44.

Of larger diameter than the disc 41 and below disc 41 in the position of the valve shown in FIG. 2 is a body liner 46 having a conical entrance. The function of the liner 46 is to direct the flow into the tube 47 which leads to the diaphragm case 48. Further, to direct the flow toward the diaphragm case the body cavity is fabricated as indicated by reference numeral 49.

It will be noted that seat ring surface 39, disc 41 and flow control plate 38 all have sharp outer corners of approximately 90°, where the flow of fluid detaches from them, to prevent inconsistent flow patterns from developing. It will also be seen that the body parts direct the flow coming from seat ring 37 and disc 41 toward the higher pressure side of the diaphragm casing 48, creating an impact pressure. The impact pressure is greatest when disc 41 is nearly closed and its velocity is highest and diminishes as disc 41 opens. The change in impact pressure creates a boost effect which partly compensates for the decreasing force of the regulator spring 54 (hereinafter described) due to its expansion as disc 41 opens and thus helps to keep the differential pressure maintained by the regulator constant and hence helps to maintain flow through the filter 11 constant.

Diaphragm casing 48 consists of two halves 51, 52 and sealed between the two halves is a flexible diaphragm 53. The tube 47 leads to the casing half 51 on one side of diaphragm 53. Compression spring 54 is installed in compression spring housing 56 which projects from the second casing half 52 in a direction away from the diaphragm 53. The proximal end of spring 54 bears against hub 57 in the center of diaphragm 53. The distal end of spring 54 bears against a nut 58 which is threaded into the housing 56 so that the position of the nut adjusts the force of the spring 54. The outer end of spring housing 56 is closed off by a cap 59.

The position of diaphragm 53 determines the position of disc 41. Accordingly, a pin 61 which is bifurcated on its end is connected to a compound lever 62 by means of a pivot 63. The lever 62 is pivotted to casing half 51 by pivot 64 and boss 66 on half 51. The long arm 67 of lever 62 has a knob 68 on its outer end which fits into a socket 69 on hub 57. Thus disc 41 reciprocates relative to seat surface 39 depending upon the differential of pressure on opposite sides of diaphragm 53. The passage 71 within the tube 47 communicates to the left side of diaphragm 53 as viewed in FIG. 1 the pressure within side 28 of the body cavity plus the impact pressure created by the flow. The pressure on the opposite side of the diaphragm 53 opposite body 26 is established through a port 72 in casing half 52 which is connected by means of a tube 73 to a tee 74 in the piping system 19 on the side opposite metering orifice 13. A union 76 completes the connection of the piping system 19 to the source of vacuum conduit 14.

ADJUSTABLE METERING ORIFICE

The adjustable metering orifice 13 comprises a body 81 having inlet 82 and outlet 83 at right angles to each other and connected into the piping system. Between the inlet and outlet is a partition 84. A bonnet 86 is threaded into the body 81 perpendicular to the partition 84. An internally threaded bushing 87 is at the outer end of the bonnet 86; and preferably, this bushing 87 is not threaded into the bonnet 86 but is held by epoxy or other adhesive 99. The bore 88 of bonnet 86 is very accurately machined as a guide surface. Within the bonnet 86 is a spindle 91 having a conical tip 92 at the end opposite bushing 87 and having a threaded portion 93 which mates with the threads of bushing 87. The outer end 94 of spindle 91 is used for adjustment of the position of the spindle 91 by a removable hand wheel or the like. An O-ring 95 in a groove in spindle 91 seals against the bore 88. While the angle and position of the inlet are not critical, the outlet should be concentric with the spindle to give a symmetrical flow pattern.

In an opening in partition 84 is an orifice bushing 96. As best shown in FIG. 4, the bushing 96 has a tapered orifice 97 which matches the taper of the tip 92 of spindle 91. Also, as shown in FIG. 4, the entrance corner 101 of the conical orifice 97 is rounded while the outlet corner 102 is approximately 90° and is sharp in order to prevent inconsistent flow patterns from developing. A counterbore 100 is formed in bushing 96 to reduce the thickness, and hence to reduce the required inlet diameter of the conical orifice for a given outlet diameter. This counterbore is large enough in diameter so that there is negligible influence from it on the flow pattern emerging from the orifice.

As has previously been stated, for proper operation the tip 92 must be concentric with orifice 97 and the accurate fit between spindle 91 and bore 88 maintains the concentricity. In assembly, the orifice bushing 96 and the threaded bushing 87 are "floated" into place, the epoxy or other adhesive 98, permitting such assembly. Later the tip 92 is seated in the orifice 97 while the epoxy, 99 is hardening. In conventional needle valve constructions, the thread on the spindle acts both to center the spindle and also, in collaboration with the mating threads in the bonnet, to position the spindle axially. Consequentially, there is likely to be misalignment between the spindle and the orifice in the body. Furthermore, it is necessary that there be clearance between the female and male threads which may result in the tip of the spindle not staying rigidly concentric with the orifice in the body and giving erratic performance when the spindle is nudged or adjusted. These defects of the prior art are eliminated in accordance with the present invention.

Preliminary to the operation of the device, the flow is calibrated. Flow test equipment is connected to the coupling 18, replacing the filter holder 17. This consists of a load simulator valve (not shown) and a calibrating flow meter (not shown). With the load simulator valve open, the pointer 34 will be close to zero. A removable hand wheel is attached to the end 94 to turn the spindle 91 until the calibrating flow meter is in proper condition. The automatic flow control system of the present invention then is tested by slowly closing the load simulator valve (to simulate filter loading) and observing the effect of this load on the position of the pointer 34. The control limit marker 36 is manually set at a point where there is a 1%, 2-½% or 5% drop in flow rate from the initial setting, depending upon the flow accuracy required. The interval on the gauge 32 between the pointer 34 and the marker 36 is the margin available for flow control. An operating flow rate is selected where there is a safe, but not excessive, margin during the desired sampling interval; and, which of course must be within the capacity of the central pumping station.

After the calibration equipment has been removed, and the filter holder 17 reinstalled, the system will insure accurate constant flow rate through the filter media 16, despite the fact that with the passage of time contaminants will load the filter 16 and cause a greater impedance to the flow. These variables are compensated by the regulator 12 acting in cooperation with metering orifice 13.

FIG. 5 shows performance rates in graphical form. The ordinate is proportional to the flow of air into a simulated filter in cubic feet per minute free air at atmospheric pressure. The abscissa plots the pressure drop across the simulated filter in inches of mercury. The solid line curves show the control limit for a 5% drop in flow rate at different flow settings and the dotted curve shows the control limit for a 5% drop in a conventional regulator without the "boost" effect. Ten inches of mercury is assembled to be the available vacuum in line 14 of the piping system. Of equal importance is the fact that the flow rate in these tests was steady and remained constant when the system was turned off and on, or when simulated filter loads were applied and removed. Prior to making the improvements described in this invention there was both a small high frequency flutter in the flow rate, and random variations in the flow setting of as much as 5% that were the result of inconsistent flow patterns within the differential pressure regulator and the adjustable metering orifice.

What is claimed is:
1. A self-actuated flow regulator system comprising:
a load through which a pre-determined constant rate of fluid flow is to be maintained,
a differential pressure regulator,
a first conduit between said load and said regulator,
first means for indicating the fluid pressure in said first conduit and its relationship to the maximum pressure drop across said load for constant flow operation,
second means for generating a pressure differential in response to the rate of fluid flow,
a second conduit between said regulator and said second means,
a source of constant downstream pressure less than the pressure external to said load,
a third conduit between said second means and said source,
said regulator maintaining a constant difference in pressure across said second means and thereby maintaining a constant flow rate through said load,
said regulator having a hollow body formed with a partition and a valve seat in said partition, said first conduit communicating with a first side and said second conduit with a second side of said partition,
a diaphragm casing attached to said body,
a diaphragm sealed in said casing dividing said casing into lower and higher pressure sides,
a fourth conduit between the higher pressure side of said diaphragm casing and the second side of said partition,
third means for biasing said diaphragm toward said higher pressure side, a valve member reciprocable toward and away from said valve seat, forth means for moving said valve member responsive to the deflection of said diaphragm, a fifth conduit between said lower pressure side of said diaphragm casing and said third conduit, said system being characterized by flow passages in which the expansion ratio relative to length is small enough to prevent flow separation and inconsistent fluid flow patterns from occurring, said system further being characterized by sharp corners of approximately 90° where high velocity fluid flow detaches from said valve seat, said valve member, said partition, and said second means in order to prevent inconsistent fluid flow patterns from occurring.

2. A system according to claim 1 which further comprises a quick-connective coupling between said load and said conduit.

3. A system according to claim 1 in which said load is a filter, and said source is a source of substantially constant vacuum.

4. A system according to claim 3 in which said indicating means is a mechanical vacuum gauge with a supplementary marking means for indicating the maximum filter load for constant flow operation.

5. A system according to claim 1 in which said second means has a constricting throat and means for adjusting the effective flow area of said throat.

6. A system according to claim 1 in which a removeable seat ring is installed in said valve seat, said seat ring having sharp corners where the fluid flow detaches from said seat ring.

7. A system according to claim 1 in which said biasing means is a spring bearing against said diaphragm.

8. A system according to claim 7 in which said fourth conduit isolates the higher pressure side of said diaphragm from said second side of said partition except for a restricted opening at the end of said fourth conduit nearest said partition.

9. A system according to claim 8 in which said fourth conduit is constructed so that the positive velocity pressure of the fluid flow leaving said valve seat is directed through said restricted opening against the higher pressure side of said diaphragm to provide a decreasing boost effect to compensate for the decreasing force of said spring as said valve member opens.

10. A system according to claim 1 in which said valve member is located on the second side of said partition, and said means for moving said valve member includes a linkage to open said valve member as said diaphragm moves toward its higher pressure side.

11. A system according to claim 10 in which said valve seat is formed convex conical and said valve member is flat, and the included angle between said seat and said valve member is small enough to prevent flow separation and inconsistent fluid flow patterns from occurring, while at the same time producing a directed flow stream.

12. A system according to claim 10 in which said hollow body has curved interior walls formed so as to direct the high velocity fluid flow from said valve seat toward a restricted opening between the higher pressure side of said diaphragm and said second side of partition. For the purpose of obtaining a boost effect 13. A system according to claim 12 which further comprises a flow control plate against said second side of said partition having a size greater than said valve seat and having sharp corners.

14. A system according to claim 12 which further comprises a body liner interconnecting said body and said casing whose end proximal to the valve seat is formed with a bevel having a sharp outer edge, and which serves as a transition between the walls of said hollow body and said restricted opening.

15. A self-actuated differential pressure regulator comprising, a hollow body formed with a partition and a valve seat in said partition, an inlet port on a first side and an outlet port on a second side of said partition, a diaphragm casing attached to said body, a diaphragm sealed in said casing dividing said casing into lower and higher pressure sides, a conduit between the higher pressure side of said diaphragm casing and the second side of said partition, first means for biasing said diaphragm toward said higher pressure side, a valve member reciprocable toward and away from said valve seat, second means for moving said valve member responsive to the deflection of said diaphragm, said regulator being characterized by flow passages in which the expansion ratio relative to length is small enough to prevent flow separation and inconsistent flow patterns from occurring, said regulator further being characterized by sharp corners of approximately 90° where high velocity fluid flow detaches from said valve seat, said valve member and said partition, in order to prevent inconsistent fluid flow patterns from occurring.

16. A regulator according to claim 15 in which a removeable seat ring is installed in said valve seat, said seat ring having sharp corners of approximately 90° where the fluid flow detaches from said seat ring.

17. A regulator according to claim 15 in which said biasing means is a spring bearing against said diaphragm.

18. A regulator according to claim 17 in which said conduit isolates the higher pressure side of said diaphragm from said second side of said partition except for a restricted opening at the end of said conduit nearest said partition.

19. A regulator according to claim 18 in which said conduit is constructed so that the positive velocity pressure of the fluid flow leaving said valve seat is directed through said restricted opening against the higher pressure side of said diaphragm to provide a decreasing boost effect to compensate for the decreasing force of said spring as said valve member opens.

20. A regulator according to claim 15 in which said valve member is located on the second side of said partition, and said means for moving said valve member includes a linkage to open said valve member as said diaphragm moves toward its higher pressure side.

21. A regulator according to claim 20 in which said valve seat is formed convex conical and said valve member is flat, and the included angle between said seat and said valve member is small enough to prevent flow separation and inconsistent fluid flow patterns from occurring, while at the same time producing a directed flow stream.

22. A regulator according to claim 20 in which said hollow body has curved interior walls formed so as to direct the high velocity fluid flow from said valve seat toward a restricted opening between the higher pressure side of said diaphragm and said second side of said partition for the purpose of obtaining a boost effect.

23. A regulator according to claim 22 which further comprises a flow control plate against said second side of said partition, having a size greater than said valve seat and having sharp corners.

24. A regulator according to claim 22 which further comprises a body liner interconnecting said body and said casing whose end proximal to the valve seat is formed with a bevel having a sharp outer edge, and which serves as a transistion between the walls of said hollow body and said restricted opening.

* * * * *